July 4, 1939. G. I. WELSH 2,165,020
BELT CONNECTOR
Filed Nov. 20, 1936
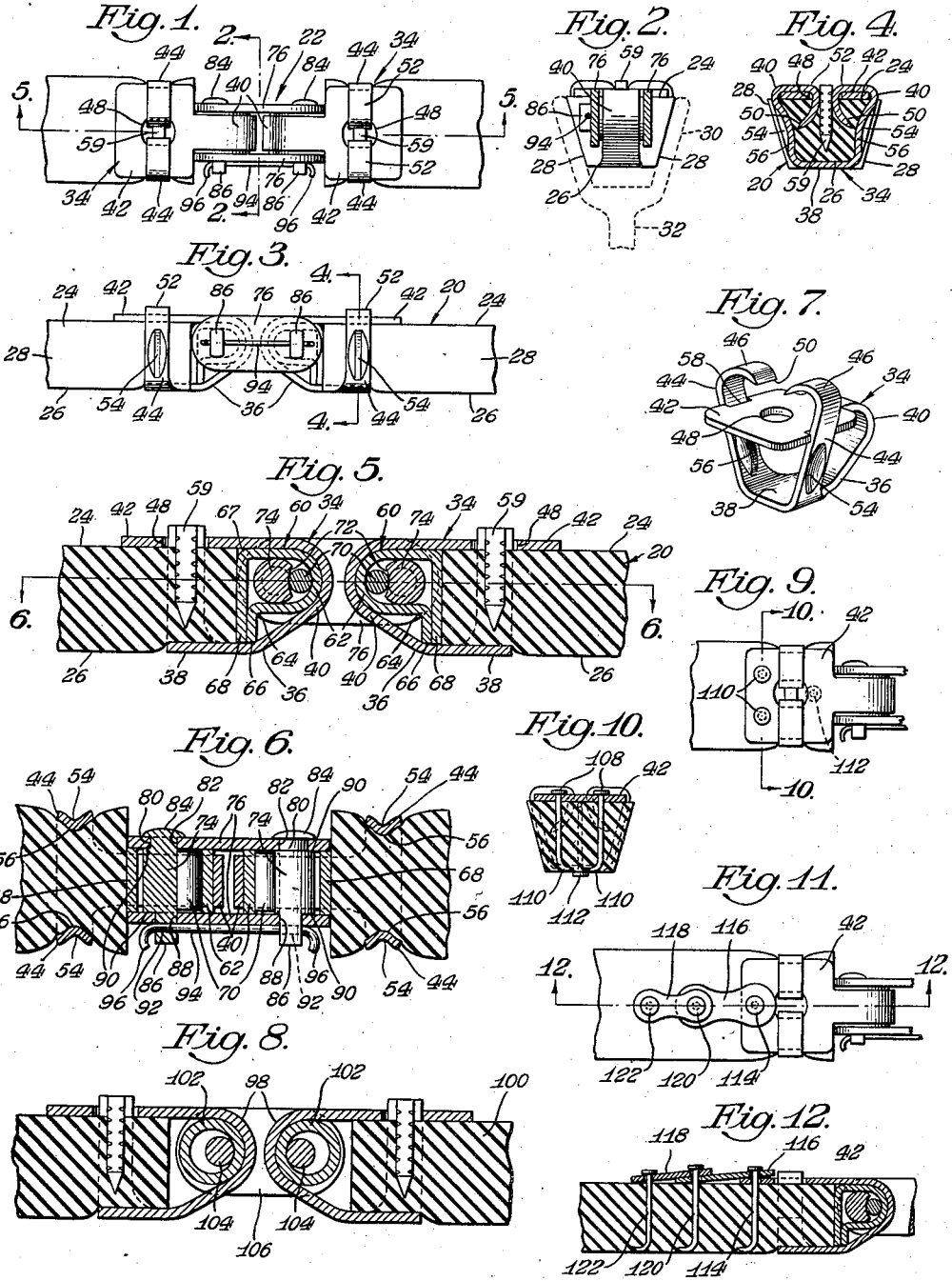
George I. Welsh
INVENTOR
BY Victor J. Evans & Co.
HIS ATTORNEYS Patented July 4, 1939

2,165,020

UNITED STATES PATENT OFFICE 2,165,020

BELT CONNECTOR

George I. Welsh, Dixon, Ill., assignor to Warren A. Shippert, Dixon, Ill.

Application November 20, 1936, Serial No. 111,944
In Canada June 24, 1936

6 Claims. (Cl. 24—33)

My invention relates to power transmission belts of the V-type, and includes among its objects and advantages the provision of an improved belt connector embodying certain improvements over the coupler disclosed in my copending application, Serial No. 48,596, filed November 6, 1935, now Patent No. 2,118,750, granted May 24, 1938.

An object of my invention is to provide a belt connector designed to facilitate connection of the belt and in which the connector includes means for compressing the belt at the points of connection together with the anchoring elements imbedded in the compressed area of the belt. The coupler further includes novel bearing means in which free rolling bearing elements are employed and arranged in such a manner as to negative wear in addition to lending a high degree of flexibility to the connector.

Another object is to provide a connector so designed as to lend an element of flexibility to the belt in the region of the connector and in which the connected belt operates in a uniform manner devoid of objectionable vibration and noise.

In the accompanying drawing:

Fig. 1 is a top plan view of my connecter applied to the two ends of a V-belt;

Fig. 2 is a sectional view along the line 2—2 of Fig. 1;

Fig. 3 is a side view of the connector illustrated in Fig. 1;

Fig. 4 is a sectional view along the line 4—4 of Fig. 3;

Fig. 5 is a sectional view along the line 5—5 of Fig. 1;

Fig. 6 is a sectional view along the line 6—6 of Fig. 5;

Fig. 7 is a perspective view of the part of the coupler which embraces the belt end;

Fig. 8 is a sectional view of a different form of coupler;

Fig. 9 is a top plan view of the coupler in combination with additional anchoring means therefor;

Fig. 10 is a sectional view along the line 10—10 of Fig. 9;

Fig. 11 is a top plan view of a different form of additional anchorage for the coupling elements; and Fig. 12 is a sectional view along the line 12—12 of Fig. 11.

In the embodiment selected to illustrate my invention, I make use of a belt 20 of the V-type in which the ends of the belt are connected by a coupler 22. The belt illustrated is conventional and comprises the usual top and bottom surfaces 24 and 26, respectively, and angular sides 28 which have frictional relation with the flanges 30 of the sheave 32.

According to Fig. 2, the belt has wedging action with the flanges 30 of the sheave 32. To secure smooth operation it is essential that the coupler be so devised as to pass over the sheave without hammering. My coupler is so related to the belt as to lie within the contour of the angular walls 28 (see Figs. 1 and 4).

To each end of the belt 20 I connect an element 34 (see Fig. 7), which element embraces the four surfaces 24, 26, and 28 of the belt. In Fig. 7, the element 34 comprises a metallic strap 36 having a portion 38 which bears against the surface 26. Strap 36 is curved at 40 and includes a plate 42 which bears against the belt surface 24. Two anchoring straps 44 are formed integrally with the strap 36 and are arranged to embrace the sides 28 of the belt.

The elements 34 are bent to substantially conform to the shape of the belt 20 in cross section, but the parts are arranged to freely receive the belt ends. After the end of the belt has been inserted in one of the elements 34, the element is placed within a suitable die for pressing the area 38 and the plate 42 firmly against the surfaces 26 and 24, respectively. At the same time, the straps 44 are pressed inwardly for compressing the material of the belt, and the curved ends 46 are pressed downwardly through the opening 48 in the plate 42. These ends are sharpened at 50 to facilitate penetration of the material of the belt.

When pressed home, the ends 46 are imbedded in the material of the belt, as indicated in Fig. 4, and portions of the straps 44 lie in flat pressure relation with the plate 42, as at 52. It will be noted in referring to Fig. 7 that the straps 44 are provided with deformations 54 which define ribs 56. These ribs press into the material of the belt while the portions of the strap 44 which embrace the angular surfaces 26 are pressed sufficiently far to lie within the contour of these surfaces.

After the ends 46 have been driven through the opening 48, an expander 58 is driven between the ends. This expander is in the nature of a pin with a roughened surface. Since the straps 44 are flat from edge to edge and the opening 48 round, the edges of the opening will tend to cut into the straps 44. Thus, the ends of the strap are firmly keyed in position, which connects the elements 34 with the belt end in such a manner as to withstand heavy loads on the belt.

The clamping relation between the element 34 and the belt end for holding purposes is supplemented by the ends 46 which are imbedded in the material of the belt. The straps 46 compress the sides of the belt while the parts 36 and 42 prevent bulging of the belt in the opposite direction. Ends 46 which are imbedded in the material of the belt lie within the compressed area so as to be firmly anchored.

Because of the arrangement of the ends 46 with respect to the compressed area, pulling forces transmitted to the ends do not cause distortion of the material of the belt. In compressing the belt sufficiently to bring the strap 44 within the contour of the angular walls 28, smooth operation is attained in addition to the elimination of noise.

Referring to Figs. 3 and 5, the area 38 compresses the bottom surface 26 slightly, and the plate 42 compresses the surface 24 slightly, if any, because of its width. The width is substantially equal to the width of the surface 24, and the plate is recessed at 58 for receiving the straps 44. In positioning the straps within the recesses 58, all the parts are effectively tied together so as to resist forces which tend to separate the parts to the end that effective connection is attained.

Within the curvature 40 of each element 34 I position a U-shaped bearing 60, the bight 62 of which fits snugly within the curvature. The one leg of the bearing 60 is bent at 64 to position its end 66 in engagement with the strap 36. The other leg of the bearing 60 is bent at 67 to provide a reach 68 lying adjacent the end of the belt with a portion paralleling the end 66. The end 66 and the reach 68 cooperate to prevent buckling or distortion of the bearing 60 and operate to hold the bearing in effective relation with the curvatures 40.

A bearing roller 70 operates within the bight 62 and the shallow groove, or concave surface, 72 in the pin 74. The bearing 60, the roller 70, and the pin 74 are made of hard steel for wearing purposes. The ends of the pin 74 are connected with links 76.

In Fig. 6, I illustrate each pin 74 as including a reduced shank 80 passing through an opening 82 in one of the links 76 and riveted at 84. The opposite end of the link comprises a shank 86 rectangular in cross section and projecting through a similarly shaped opening 88 in the other link 76. Thus, the link 76 bears against the shoulder 90. The shanks 86 are provided with openings 92 for the reception of key wires 94 which are bent at 96 to prevent displacement. The wires 94 hold all the parts of the bearing and the link 76 in assembled relation.

Because of the key wire 94, the coupler may be easily and quickly connected for joining the ends of the belt. Similarly, the coupler may be disconnected by removing the key wire. It will be noted that the shoulders 90 hold the links 76 in spaced relation.

The curvature 40 of the element 34 is in the nature of a bail, which bail is narrower than the space between the assembled links 76. This is also true of the roller 70 and the bearing 60. In terminating these parts short of the links 76, I provide spaces for releasing foreign matter which may lodge in the coupler, thus preventing the accumulation of abrasive which shortens the life of the coupler.

In arranging the roller 70 to operate against the bight 62 of a considerably larger curvature, the roller is free to move with a rolling action which minimizes wear between the parts. This is also true of the relation between the roller 70 and the concave surface 72. The U-shaped bearing 60 is of such proportion as to abut the adjacent end of the belt. Links 76 limit the endwise movement of the bearing so that all the parts are held in assembled relation when connected in the manner illustrated in Fig. 5.

Fig. 8 illustrates a slightly different form. The bails 98 and their associated parts which embrace the belt ends 100 are identical with the similar parts in element 34. The difference resides in the substitution of a bearing sleeve or cylinder 102 within which the pin 104 operates. This pin corresponds to the pin 74 and is connected with links 106 corresponding to the links 76. Sleeve 102 and the pin 104 are made of hard steel, and the pin 104 operates with a rolling action upon the inner surface of the sleeve 102.

Figs. 9 and 10 illustrate additional anchorage for the elements 34. The plate 42 is provided with a plurality of openings for the reception of nail-like elements 108 which are driven through the belt and clinched, as at 110. The portion 38 may be provided with a similar opening for the reception of a nail-like element 112 which is also clinched in the same way as the elements 108.

Figs. 11 and 12 illustrate a construction in which the plate 42 is provided with an opening for the reception of a holding element 114, which holding element passes through an opening in a link 116. This link is arranged in overlapping relation with a similar link 118, and the overlapping parts are provided with aligned openings for the reception of a second anchoring element 120. The third anchoring element 122 passes through a second opening in the link 118. All the elements 114, 120 and 122 are clinched. The links 116 and 118 perform an effective holding action but embody an element of flexibility which permits bending of the belt.

All the bearing elements operate to lend free action to the connector and will operate over long periods of time without lubrication. The relative movements between the bearing parts is characterized by a rocking action which minimizes friction, thus additionally negativing wear.

Without further elaboration, the foregoing will so fully explain my invention that others may, by applying current knowledge, readily adapt the same for use under various conditions of service.

I claim:

1. In a belt connector, a pair of clamping units each having a loop and adapted to be connected with an end of the belt, a cylindrical bearing element positioned within each loop, links positioned adjacent the ends of the loops, to hold the bearing elements inside the loops, bearing members interconnecting the links and arranged in bearing relation with said bearing elements, said bearing elements and said bearing members having smooth curvatures of different radii so as to roll freely one upon the other, one end of each bearing member being fixedly connected with one link, the other ends of the bearing members having shanks projecting through openings in the other link, and means for keying said other link to said shanks.

2. In a belt connector, a pair of clamping units each having a loop and adapted for connection with an end of the belt, a curved bearing liner fitting inside each loop, each bearing liner being of uniform curvature from end to end and having a smooth face, a roller bearing lying inside each bearing liner, said roller bearings being cylindrical in cross section and each of uniform diameter throughout its bearing length, and link means operatively connecting the roller bearings for joining the ends of the belt, said roller bearings being of considerably less radii than their respective bearing liners so as to have free rolling action thereon.

3. In a belt connector, a pair of clamping units each having a loop and adapted for connection with an end of the belt, a curved bearing liner fitting inside each loop, a roller bearing lying inside each bearing liner, said roller bearings being cylindrical in cross section and each of uniform diameter throughout its bearing length, and link means operatively connecting the roller bearings for joining the ends of the belt, said roller bearings being of considerably less radii than their respective bearing liners so as to have free rolling action thereon.

4. In a belt connector, a pair of clamping units each having a loop and adapted to be connected with an end of the belt, a curved bearing liner fitting inside each loop, a cylindrical roller bearing lying inside each bearing liner, and link means for operatively connecting the bearing liners, to connect the ends of the belt, said roller bearings being of considerably less radii than their respective bearing liners so as to have free rolling action thereon.

5. In a belt connector, a pair of clamping units each having a loop and adapted for connection with an end of the belt, a curved bearing liner fitting inside each loop, each bearing liner being of uniform curvature from end to end and having a smooth face, a bearing pin passing through each bearing liner, each bearing pin having a concaved face extending longitudinally thereof, link means operatively connecting the bearing pins for connecting the ends of the belt, and roller bearings interposed between said concaved faces and said bearing liners, said roller bearings being cylindrical in cross section and of uniform diameter from end to end, the roller bearings being of considerably less radii than their respective concaved faces and bearing liners so as to have free rolling action thereon.

6. In a belt connector, a pair of clamping units each having a loop and adapted for connection with an end of the belt, a tubular bearing liner fitting inside each loop, roller bearings extending through the tubular bearing liners, and link means operatively connecting the roller bearings for connecting the ends of the belt, said roller bearings being cylindrical in cross section and of uniform diameter from end to end, the roller bearings being of considerably less radii than their respective tubular bearing sleeves so as to have free rolling action thereon.

GEORGE I. WELSH.